PATHFINDING SYSTEM

Filed Oct. 12, 1966 3 Sheets-Sheet 1

INVENTOR
JAMES G. PEARCE
BY
Dicke & Craig
ATTORNEYS

PATHFINDING SYSTEM

Filed Oct. 12, 1966 3 Sheets-Sheet 2

INVENTOR
JAMES G. PEARCE

BY Dicke & Craig
ATTORNEYS

July 21, 1970 J. G. PEARCE 3,521,002

PATHFINDING SYSTEM

Filed Oct. 12, 1966 3 Sheets-Sheet 3

United States Patent Office
3,521,002
Patented July 21, 1970

3,521,002
PATHFINDING SYSTEM

James G. Pearce, Liverpool, England, assignor to Stromberg-Carlson Corporation, Rochester, N.Y., a corporation of Delaware Filed Oct. 12, 1966, Ser. No. 586,125
Int. Cl. H04q 3/18
U.S. Cl. 179—18 10 Claims

ABSTRACT OF THE DISCLOSURE

In connection with a concentrator system including primary, secondary and tertiary stages a hunting circuit connected to the outputs of the tertiary stage for testing each output in turn along a unique path to a marked input, including binary storage devices connectable to respective tertiary stage outputs and switchable upon detection of a free path to the marked input and selection means for selecting a path through the concentrator system in accordance with the detected state of said binary storage devices.

The present invention relates in general to communication systems, and more particularly, to a pathfinding arrangement for use in connection with time division multiplex electronic telephone communication systems.

Fully electronic telephone switching systems pose design problems due to the necessity to interwork with existing line plant, station equipment and trunk equipment. This is due basically to the need to provide an interface between the wires of the lines and trunks and the electronic equipment. Such an interface is necessary in order that the electronic time division multiplex modulating and demodulating gates can be isolated from the wire connections to the subscriber station equipment. This means that functions which are normally performed within a system on a traffic basis, such as applying high level ringing to a subscriber's line, which is usually done at the connector, and outgoing impulsing to a trunk, which is sometimes done from a register sender, have to be performed on a per line or per trunk basis. This set of circumstances, would of course be oviated if the electronic switchboard was part of a system which had appropriate station and trunk equipment designed to exploit the advantages of electronics instead of, as is the case, station and trunk equipment designed to exploit the advantages of metallic switching-path systems.

One possible way of reducing the above-mentioned problems is by using a concentrator stage which extends a low impedance high level path from the line circuit to an electromechanical-electronic interface. This permits the performance on a traffic basis of functions necessarily performed on a per line basis in a completely electronic system. The system embodying the present invention utilizes a primary, secondary and tertiary concentrator stage as a means of providing a plurality of time shared paths from the line circuit directly into a dial pulse accept or over a metallic path provided by sealed red cross points. The problem to which the present invention is directed relates to a selection of a suitable free path from a marked line circuit through the stages of the concentrator to a free dial pulse acceptor in an automatic manner.

In accordance with the present invention, a marking is applied to the appropriate equipment position represented by the calling line circuit, which marking is extended through all free and accessible primary, secondary, and tertiary switches in the concentrator stages to the free line dial pulse acceptors. A hunting circuit in accordance with the present invention is now connected to each of the outputs of the tertiary stage of the concentrator connected to the dial pulse acceptors for the purpose of testing each of the marked line dial pulsers in turn. As a result of the impedance of the hunting circuit, the testing current passing through each of the operate switch windings in the paths through the concentrator is of insufficient amplitude to permanently operate the cross points therein but is sufficient to provide an indication (represented by the absence of this testing current at each marked output of the concentrator) so as to indicate whether the respective path is free or busy. The condition of each marked output from the concentrator, as determined by the hunting circuit, is stored so that upon completion of testing of each of the marked output lines from the concentrator, a selector arrangement may be initiated to select the first available free dial pulse acceptor for association with the marked line circuit. Upon selection of the first free dial pulse acceptor, a low impedance condition is provided in the hunting circuit to increase the testing current passing through the selected path in the concentrator, thereby resulting in the simultaneous operation of all cross points in the selected path.

It is a principal object of the present invention to provide a means in conjunction with electronic telephone switching equipment for automatically selecting a free path from a line circuit through a plurality of concentrator stages.

It is another object of the present invention to provide means in connection with an electronic telephone switching system for automatically selecting a free path from a marked line circuit through a plurality of concentrator stages and simultaneously selecting therewith on a traffic basis available control equipment providing an interface between the line circuits and electronic switching equipment.

These and other objects, features and advantages of the present invention will become more apparent from the following detailed description thereof, when taken in conjunction with the accompanying drawings, which illustrate one embodiment of the present invention, and wherein.

Figure 1:
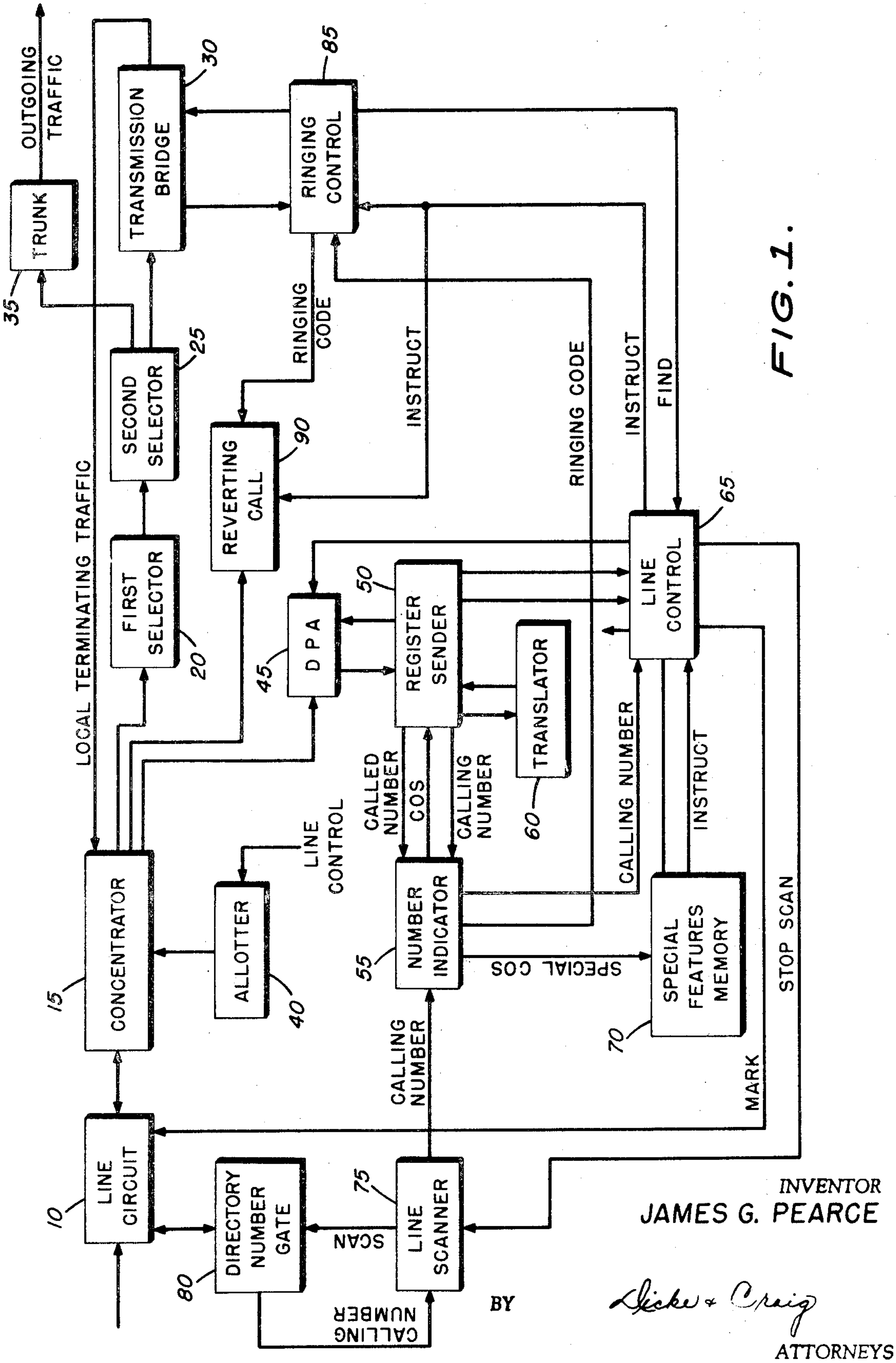
FIG. 1 is a schematic block diagram of a time division multiplex electronic switching system embodying the principles of the present invention.

Referring now to the drawings, FIG. 1 illustrates a typical telephone electronic switching system with which the arrangement of the present invention may be associated. However, it is to be understood that the present invention may be related to other systems than the one specifically illustrated in FIG. 1 and described herein, as will be apparent from an understanding of the general principles of the invention. In fact, the arrangement of the present invention has general utility in all space division and time division multiplex electronic telephone systems.

In FIG. 1, one of a plurality of line circuits 10 is connected through a concentrator 15, first selector 20, second selector 25 to transmission bridge 30 which forms an interface between the calling and called lines and the highway gates providing an output back to the concentrator 15 for application of local calls to a called line circuit. Outgoing traffic is connected from the output of the second selector 25 through trunk circuit 35. An allotter 40 is connected to concentrator 15 and controlled by line control 65 in the well known manner.

The concentrator 15 includes primary, secondary and tertiary stages, as will be described in connection with FIG. 2, which provide multiple paths between each line circuit, such as line circuit 10, and a plurality of dial pulse acceptors, such as dial pulse acceptor 45, thereby making the dial pulse acceptors available on a traffic basis. Although not specifically indicated in FIG. 1, it is preferable that the output of the secondary stage of the concentrator be connected directly to the input of the first selector 20, with the tertiary outputs being connected to the dial pulse acceptors. In this way, the number of gate circuits per highway is reduced to a level at which splitting gates to localize the capacitance of a highway is not required and the desired number of outputs for the dial pulse acceptors is available.

One of a plurality of dial pulse acceptors 45 is shown in FIG. 1 as connected to the output of concentrator 15, which provides an interface between the calling subscribers and the time divided register sender 50 and accepts and stores dialed impulses received from the concentrator 15 and applies this dialed information to the register sender 50 for further processing. The register sender 50 has one cell per dial pulse acceptor allocated to it, and checks the on-hook and off-hook signal samples received from a dial pulse acceptor and builds these up into the called number by writing the information into the relevant memory cell. In addition to this, the register sender stores the calling number and generates dial pulse or controls multi-frequency outgoing signals for trunks. Associated with register sender 50 is a number indicator 55 which forms a temporary memory providing the equipment number of the calling party from the received directory number, and also providing a class of service (COS) information regarding both the called and calling parties. The number of the called party is provided from the dialed information received through the dial pulse acceptor 45 and the directory number of the calling party is received via the directory number gate 80 and the line scanner 75 connected to the line circuit 10. Class of service information is then applied from the number indicator 55 to the register sender 50 and also to a special features memory 70 which permits the storage of numbers for call forwarding and the storage of information to route calls to telephone answering services and for other special functions.

There is also associated with the register sender 50 a translator 60 which is in the form of a permanent memory providing the required routing information to steer a call to its destination and also providing a translation of dialed codes received through the dial pulse acceptor 45. In response to routing information received from the member indicator 55 and translator 60, the register sender 50 effects control of the line control 65 to mark the calling and called line circuits and to apply ring back and ringing, respectively, thereto, through control of ringing control 85 which is connected to transmission bridge 30. The ringing code for the particular parties involved is received from the number indicator 55 and connected directly to the ringing control 85.

The line control 65 also provides control of a revertive call circuit 90 which is also connected to the ringing control 85 and derives necessary ringing control both for the calling and called parties therefrom. The ringing generated in the revertive call circuit 90 is then applied back through the concentrator 15 to the line circuit associated with the reverting call.

The general operation of the system illustrated in FIG. 1 for establishing a communication connection between subscribers associated with different line circuits, whether local or outgoing, is sufficiently well known that a detailed description thereof herein is believed unnecessary. Therefore, the description of the operation of FIG. 1 will be only sufficiently detailed to provide a basis of understanding for the arrangement of the present invention.

The line scanner 75 constantly tests each line to determine whether or not it has originated a call and requires connection to the register equipment to establish a path to the required number. As soon as it finds such a line which is indicated by a potential change within the line circuit, it stops the scanning operation through control from the line control 65, which locates the line group in which the line circuit is located and indicates the directory number of the line which is calling.

Figure 3:
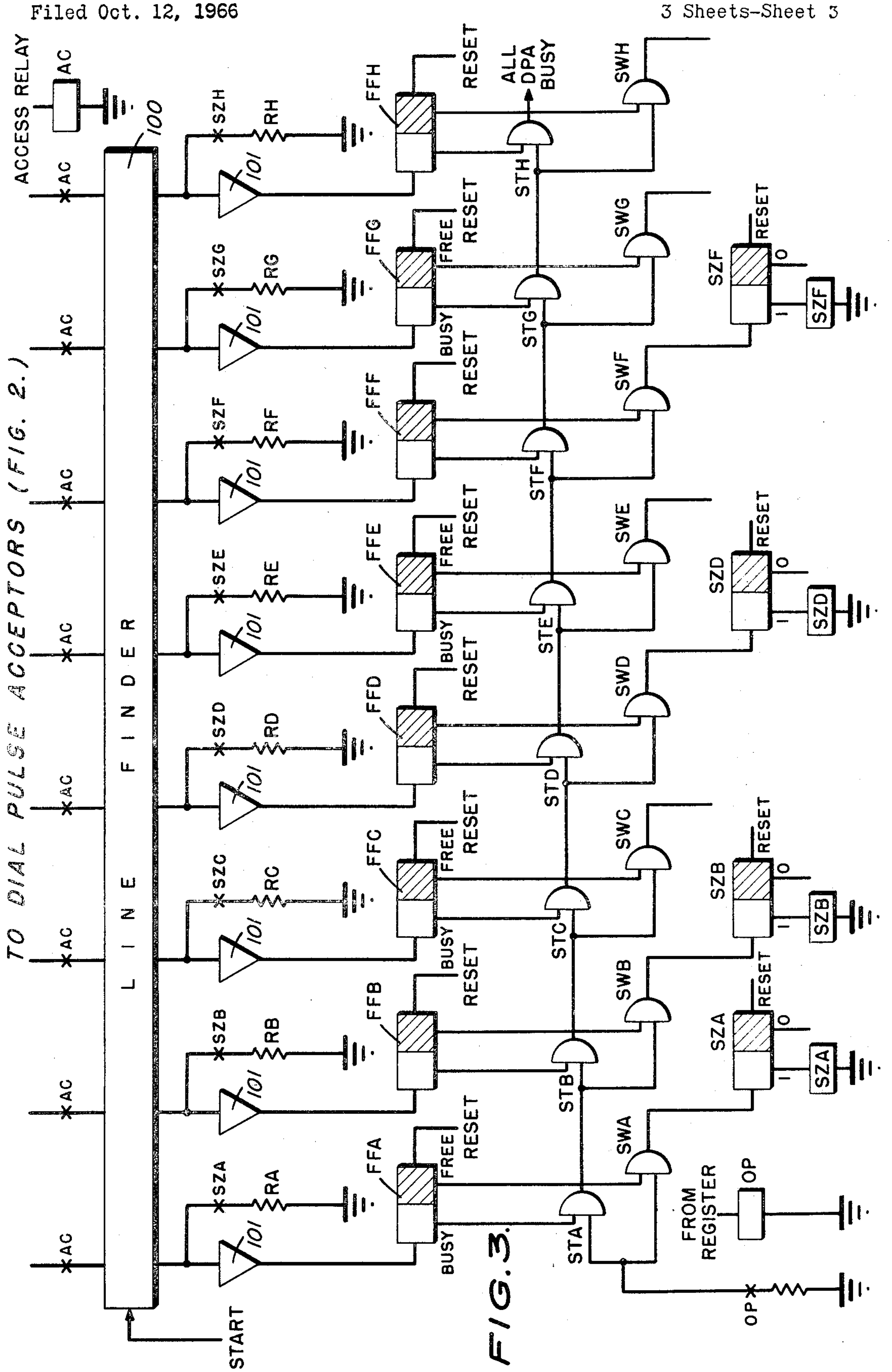
FIG. 3 is a schematic diagram of the hunting circuit in accordance with the present invention for use in conjunction with the concentrator illustrated in FIG. 2.

The directory number of the calling line is now signalled into the number indicator 55 which results in a marking being applied to the appropriate equipment position of the calling subscriber. This marking is extended through all free and accessible paths in the concentrator 15 to all free line dial pulse acceptors 45. The hunting operation of the present invention, which is to be described in connection with FIG. 3, is then commenced until a dial pulse acceptor is selected and a free path through the concentrator to the selected dial pulse acceptor is established through operation of the appropriate cross points therein.

As soon as the necessary cross points in the concentrator are closed, the marking from the calling line is removed, the line control is released and the scanning is resumed for additional calling line circuits. The calling subscriber's line is now extended directly into the dial pulse acceptor 45 which returns dial tone from the register sender 50. As soon as the first dial impulse commences, the dial pulse acceptor disconnects dial tone from the line circuit and awaits receipt of dial pulses or hook conditions.

The register sender 50 examines each of the dial pulse acceptors 45 associated with it at regular intervals, and each time the storage cell in the register sender corresponding to a particular dial pulse acceptor occupies the register process store, the incoming subscriber's loop is examined and a record of its state written into the appropriate part of the cell. As a result of this, the called number is stored in the register sender 50. As soon as sufficient information is obtained to indicate the called number, reference is made to the translator 60 which supplies the necesary routing information to the register control. The register sender 50, which has available in it the calling number and the called directory number, accesses the line control 65 and signals the routing information into the line control, which is used to establish a call in a similar way as the calling line circuit is detected, except that instead of a check for a free and accessible dial pulse acceptor, a check is made for a free ringing control 85. The line control marks all free and acessible transmission bridge and ringing controls, hunts over them, and chooses the first free circuit marking backward over the path and thereby operating the reeds in the chosen path, in a manner similar to that described in connection with the path selection related to the calling line circuit, as set forth in connection with FIGS. 2 and 3.

The original path from the calling party to the line dial pulse acceptor is now released and a path is extended to the transmission bridge 30 so as to effect connection of the calling and called line circuits to the transmission bridge. The ringing control circuit now applies the relevant ringing conditions derived from the register sender to the transmission bridge 30, which is split to provide the proper ringing to the called line circuit and provide ring back tone to the calling party. As soon as the called party answers, ringing is tripped and the ringing control circuit switches itself out of the connection, leaving the called party connected by the primary and secondary stages of the concentrator to the call transmission bridge. A call is then established from the calling line to the called line and this call continues until the calling subscriber or the called subscriber terminates the conversation.

Figure 2:
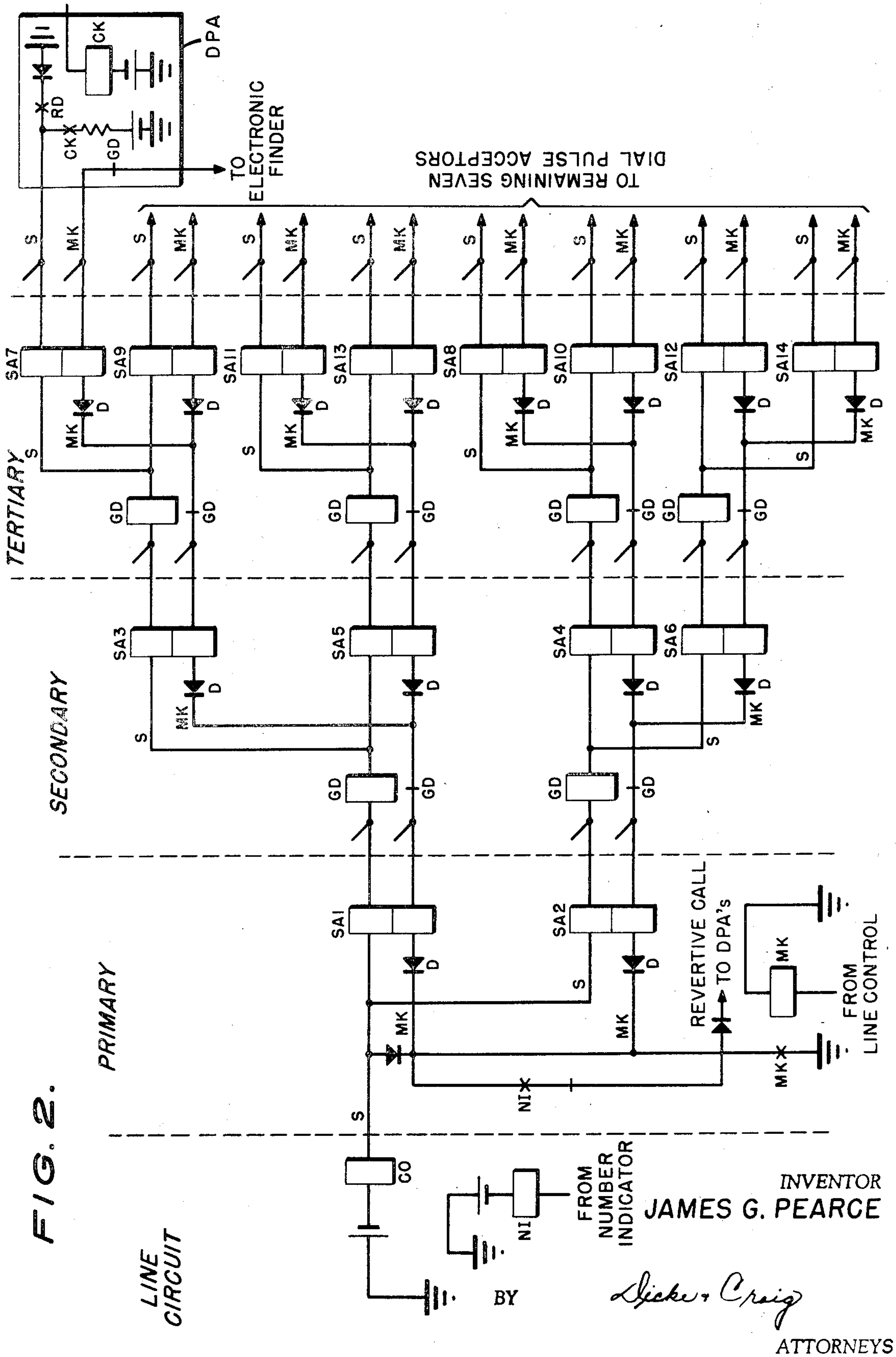
FIG. 2 is a circuit diagram of a portion of the concentrator of FIG. 1, indicating the three stages thereof and the association with suitable dial pulse acceptors.

Referring now to FIG. 2, which discloses a more detailed circuit diagram of the concentrator 15 illustrated in FIG. 1, only those portions of the line circuit and the primary, secondary, and teritary stages of the concentrator are illustrated in FIG. 2 that are directly involved in the functioning of the path finding arrangement in accordance with the present invention. The transmission lines T and R provided from the line circuit throughout the transmission path between subscribers has been eliminated in order to provide a clearer illustration of the control network including the control lines S and MK which are utilized for testing and selection of a free path through the concentrator network. However, as is apparent from the concentrator arrangement illustrated, the transmission lines T and R are provided in each of the primary, secondary and tertiary stages of the concentrator in the same general pattern as the control lines S and MK. Thus, the transmission lines T and R will branch from the line circuit to each of the dial pulse acceptors 45 connected to the outputs of the tertiary stage of the concentrator and the contacts of the relays SA in each of the stages of the concentrator will be located in the lines T and R for purposes of controlling interconnection of these transmission lines from the line circuit through to a selected dial pulse acceptor.

The line circuit provides the well known cut off relay CO connected to the sleeve lead S which extends to the primary stage of the concentrator 15. This primary stage of the concentrator includes a pair of line control relays SA1 and SA2 of the dual winding type with one operate winding thereof connected to the sleeve lead S and the other operate winding thereof connected to the control lead MK. The contacts of the relays SA1 and SA2 are connected in the appropriate branches of the transmission lines T and R in the primary stage of the concentrator. In addition, diodes D are provided in the MK lead at the input to the operate winding of relays SA1 and SA2 to insure proper direction of the test signals which flow therethrough, and to isolate the signal from other primaries sharing the same link.

The output from each of the line relays SA1 and SA2 in the primary stage of the concentrator are connected to respective guard relays GD having an operate winding in the sleeve lead S and contacts in the control lead MK. Thus, if the link of the sleeve lead S is in use the guard relay will be energized opening the corresponding control lead MK associated with that link.

The secondary stage of the concentrator includes relays SA3, SA5, SA4 and SA6. As in the primary stage, these relays also have two operate windings, one winding being connected to the sleeve lead S and the other operate winding being connected to the control lead MK in each link thereof. The output from each of the relays in the secondary stage of the concentrator is once again connected to respective guard relays GD which control the condition of the control lead MK associated with the particular link.

The tertiary stage of the concentrator includes relays SA7, SA9, SA11, SA13, SA8, SA10, SA12 and SA14. These relays are also provided with operate windings both in the sleeve lead S and the control lead MK in each of the links within which they are connected. The output leads, both the sleeve lead S and the control lead MK, are connected to a respective dial pulse acceptor with the control lead MK passing through the dial pulse acceptor for application to the electronic finder, illustrated in FIG. 3. This will be made clear from the following description. The contacts of a guard relay GD within each dial pulse acceptor (not shown) are provided in the MK lead passing therethrough to prevent association of a concentrator output connected through a busy acceptor with the electronic finder.

The electronic finder determines a free path through the concentrator from the marked line circuit to an available dial pulse acceptor and upon selecting such a path sets the cross points by operation of the appropriate relays SA along the path. At the same time, a control signal is returned to the selected dial pulse acceptor for controlling a relay therein which marks ground on the sleeve lead S connected to the dial pulse acceptor thereby holding the cross points in the concentrator.

Referring now to FIG. 3, the electronic finder in accordance with the present invention includes a line finder 100 of conventional configuration capable of stepping selectively to each of the eight input lines MK from the output of the concentrator tertiary upon application thereto of a start signal. The contacts of an access relay AC are connected to each of the lines MK at the input to the line finder 100, which relay AC is operated from the register sender 50 for association of the electronic finder with the concentrator 15 and dial pulse acceptors 45 at the time that the calling line circuit is marked by the line control 65.

A hunting circuit generally consisting of a high impedance amplifier 101 and flip flop FFA through FFH connected thereto is provided at each of the eight terminals of the line finder 100 for connection in sequence to the control lines MK associated with the dial pulse acceptors 45 and concentrator outputs. The amplifier 101 is of sufficiently high impedance to be sensitive only to a level of approximately 500 microamps, a current level which will not be sufficient to operate the cross points in the various stages of the concentrator, but will be sufficient to switch the flip flop FF from the free to the busy state. It is noted at this point that the various elements in each hunting circuit are provided with a suffix designation A through H to distignuish between comparable elements in each of the hunting circuits. Thus, the hunting circuit connected to the first contact of the line finder 100 is provided with a flip flop FFA, the second with a flip flop FFB, and so forth.

A resistor R and a ground source B combination is connected in series through contacts of a relay SZ to the input line to each of the amplifiers 101 in the hunting circuits connected to the line finder 100. The value of the resistor R is sufficiently low to provide an impedance along the path connected thereto capable of increasing the current level in the path to an amount sufficient to permanently operate the cross points in the concentrator stages. Thus, upon operation of the relay SZ associated with a particular hunting circuit, the resistance R and ground B will be connected through the contacts of the relay to the respective contacts of line finder 100 generating a current through the path connected to the hunting circuit in the concentrator stages having an amplitude sufficient to permanently operate the cross points therein.

There is connected to the output of the flip flops FFA through FFH a selector circuit consisting of a plurality of AND gates STA through STH and SWA through SWH. The "0" or "busy" output of the flip flop FF in each hunting circuit is connected to the corresponding AND gate ST along with the output from the corresponding AND gate ST in the preceding stage. The "1" or "free" output of the flip flop FF is connected to the AND gate SW to which is also connected the output of the ST AND gate from the preceding stage. The output of the AND gate SW in each hunting circuit is connected to an individual flip flop SZ which is in turn connected to an individual relay SZ whose contacts serve as the means connecting the resistance R and ground B combination to the input of the amplifier 101 in the hunting circuit. The input to the AND gates STA and SWA connected to the first hunting circuit is connected through the contacts of an operate relay OP to a ground mark. The relay OP is operated from the register sender 50 in accordance with the operation to be described hereinafter.

The electronic finder in accordance with the present invention is operated under control of the line control 65 in two separate steps. The indication by the line scanner 76 of the existence of a calling line circuit results in a marking of the line circuit from the line control 65 which marking is applied through operation of the relay MK associated with the primary of the concentrator as illustrated in FIG. 2. Operation of the relay MK closes the contacts thereof connected to the control line MK, which marking is extended through all free and accessible primary, secondary and tertiary switches to free line dial pulse acceptors. Obviously, if any link of the concentrator is at that time associated with another line circuit, the guard relay in the sleeve lead S will be energized opening the normally closed contacts in the control lead MK thereof preventing an extension of the marking through this link. At the same time that the relay MK is energized to mark the input to the concentrator 15, the access relay AC having contacts in the lead extending between the dial pulse acceptors and the line finder 100 is energized via the line control 65 to associate each of the dial pulse acceptors with the line finder.

A start signal is then applied to the line finder which connects each of the inputs from the dial pulse acceptors in a successive fashion to each of the hunting circuits connected in the output thereof such that receipt of the test signal by a hunting circuit indicating that each of the links traversed by the signal were free results in switching of the flip flop in the hunting circuit to its "free" state. In a like manner, for those paths through the concentractor stages having a link already occupied and thereby blocked by the guard relay GD no test signal will pass from the concentrator to the hunting circuit connected thereto thereby leaving the flip flop FF in its normal "busy" state. It should be remembered at this time that the impedance of amplifier 101 in each of the hunting circuits is sufficiently high that the testing signal in the path to and through the amplifier will be held to a maximum level of approximately 500 microamps which will pass the operate windings of the relays SA in the concentrator but will be of insufficient amplitude to operate the cross points associated therewith.

Having successively connected each of the hunting circuits with the respective control leads MK from the dial pulse acceptors, the flip flops FFA through FFH will record and store the busy-free condition of each of the paths of the concentrator connected thereto and the outputs from these flip flops will reflect the condition of each of these paths.

The relay MK in the primary of the concentrator is then deenergized by the line control and the relay OP associated with the selector connected to the hunting circuits is energized to initiate the "operate" step of the operation. The purpose of the selector arrangement is to choose the first available path through the concentrator having a free dial pulse acceptor connected thereto. The operation of the relay OP in the selector circuit will serve to enable one of the AND gates STA or SWA depending upon the busy-free condition of the path connected to the first hunting circuit, as recorded in the flip flop FFA. If this path is free, the AND gate SWA will be enabled switching the flip flops SZA to its operate condition energizing the relay SZ. Energization of the relay SZ will in turn connect the resistance RA and the ground B combination to the line finder 100 thereby providing a current of sufficient amplitude to permanently operate the cross points in the path connected to this first contact of the line finder.

If, however, the flip flop FFA indicates that the path connected thereto is busy, the AND gate STA will be enabled, providing an enabling signal to the next stage of the selector circuit associated with the second hunting circuit. This enabling signal is connected to both of the AND gates SYB and SWB so that one of the two AND gates will be enabled depending upon the busy-free condition of the path connected to the second hunting circuit as determined by the flip flop FFB. If the path is free, the AND gate SWB will be enabled effecting a switching of the flip flop SZB to its operate condition energizing a relay SZ to connect a combination of resistor RB and ground B to the respective path through the concentrator to operate each of the cross points in the path.

It is therefore apparent that if more than one path is available through the concentrator, only the first available path as determined by the selector circuit will be chosen since the selection is carried on in a step by step manner through progressive interrogation of the flip flops FFA through FFH.

The operation of the crosspoints in the concentrator stage serve to connect the cut off relay CO via the sleeve lead S to the selected dial pulse acceptor, which in the well known manner serves to actuate the guard relay GD therein opening the control lead MK to the line finder and preventing further selection of this dial pulse acceptor until it is released from operation. The invention therefore provides an automatic arrangement for testing each of the paths through the primary, secondary and tertiary stages of the concentrator to a marked line circuit for an available free path for association with a free dial pulse acceptor.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. In an electronic telephone communication system including a plurality of originating and terminating line circuits, a register sender system for controlling the interconnection of said line circuits, a plurality of dial pulse acceptors for receiving dialed impulses from a given orginating line circuit identifying a given terminating line circuit, and a concentrator having a plurality of trasmission paths and a plurality of associated control paths including switching devices for interconnecting each of said originating line circuits with any one of said dial pulse acceptors, said switching devices effecting completion of the associated transmission paths therebetween, a system for finding a free path from said given originating line circuit to a free dial pulse acceptor comprising a plurality of binary storage devices switchable between first and second states, current limiting means selectively connected to a control path of said concentrator and to a respective storage device, and test means responsive to said register sender system for applying a signal to each of the control paths of said concentrator for application to a storage device connected thereto for switching said device from its first to its second state.

2. The combination defined in claim 1 wherein said current limiting means is an amplifier capable of limiting the current in each control path of the concentrator to a value less than that necessary to operate said switching devices.

3. The combination defined in claim 2 wherein each transmission path in said concentrator includes guard relay means for opening the associated control path therein upon connection of said transmission path to a dial pulse acceptor.

4. The combination defined in claim 3 wherein each dial pulse acceptor includes guard relay means for opening the associated control path from said concentrator upon connection of said dial pulse acceptor through a transmission path to a line circuit.

5. The combination defined in claim 4 further including switching means for sequentially connecting the paths of said concentrator to said respective current limiting means.

6. The combination defined in claim 5 further including selector means connected to said storage devices for detecting the first available path through said concentrator to a free dial pulse acceptor from the state of said storage devices.

7. The combination defined in claim 6, wherein said selector means includes a first and a second plurality of AND gates a pair of gates including one of each of said first and second pluralities of AND gates being connected to a respective storage device and responsive to the first and second states thereof, respectively, the output of each gate of said first plurality of AND gates being connected to the input of the gates of said first and second plurality of AND gates associated with the next storage device in the sequence of said switching means.

8. The combination defined in claim 7 further including current control means for establishing a current in said control paths capable of operating the switching devices therein and a control relay means connected to the output of each of said second plurality of AND gates for connecting a current control means to the control path associated with the storage device to which each of said second plurality of AND gates is connected.

9. The combination defined in claim 8 wherein said current control means each include a source of direct current potential and impedance means of value sufficient to permit the establishment of a current in the control path capable of operating said switching devices.

10. The combination defined in claim 9 further including operate relay means responsive to said register sender system for enabling one gate of said pair of gates associated with the first storage device in the sequence of said switching means.

References Cited

UNITED STATES PATENTS 2,806,088 9/1957 Joel.

WILLIAM C. COOPER, Primary Examiner